United States Patent [19]
Pawlik

[11] Patent Number: 5,020,944
[45] Date of Patent: Jun. 4, 1991

[54] INDEXABLE INSERT FOR ROUGHING AND FINISHING

[75] Inventor: James A. Pawlik, Sterling Heights, Mich.

[73] Assignee: GTE Valenite Corporation, Troy, Mich.

[21] Appl. No.: 485,808

[22] Filed: Feb. 23, 1990

Related U.S. Application Data

[63] Continuation of Ser. No. 268,391, Oct. 31, 1988, abandoned, which is a continuation of Ser. No. 171,332, Mar. 21, 1987.

[51] Int. Cl.⁵ .............................................. B26D 1/29
[52] U.S. Cl. ...................................... 407/42; 407/40; 407/113; 407/114
[58] Field of Search .................... 407/40, 42, 113, 114

[56] References Cited

U.S. PATENT DOCUMENTS

| 4,220,429 | 9/1980 | Powers et al. ............... 407/40 |
| 4,564,321 | 1/1986 | Kondo et al. ................ 407/42 |
| 4,597,695 | 7/1986 | Johnson ...................... 407/42 |

FOREIGN PATENT DOCUMENTS

| 2805670 | 8/1978 | Fed. Rep. of Germany ........ 407/42 |
| 0013184 | 1/1984 | Japan ............................. 407/40 |
| 0153335 | 1/1982 | Sweden .......................... 407/113 |

Primary Examiner—Frederick R. Schmidt
Assistant Examiner—Jack Lavinder
Attorney, Agent, or Firm—Bill C. Panagos; William H. McNeill

[57] ABSTRACT

A cutting tool employing negative cutting inserts providing both high volume stock removal and a fine surface finish. The insert utilizes negative radial and positive axial rake angles and incorporates a lead angle of between about 30° to about 90°.

30 Claims, 4 Drawing Sheets

INDEXABLE INSERT FOR ROUGHING AND FINISHING

This is a continuation of copending application Ser. No. 07/268,391, filed on Oct. 31, 1988, now abandoned which is a continuation of Ser. No. 07/171,332, filed on Mar. 21, 1987, still pending.

FIELD OF THE INVENTION

This invention relates to cutting tools employing lay down negative inserts and, more particularly, to indexable inserts with negative radial and positive axial rake angles.

BACKGROUND OF THE INVENTION

The field of cutting tools employing indexable lay down inserts encompasses a wide range of tools including face mills, step mills, end mills, boring tools and turning tools to name a few. These tools incorporate an equally varied array of cutting edge designs to accommodate both the operational parameters of the tools and the production specifications of the workpiece. Where it is desirous to remove large volumes of material (rough cutting) by face milling, the cutting edge has been designed to withstand higher loading. For example, a face milling tool employed to rough cut carbon steel, driven by a 30-50 horsepower machine may operate at a feed rate of 0.015 inches per tooth at a 0.125-0.250 inch depth of cut utilizing a surface feed rate of 200-300 feet per minute. Smooth finish milling, however, places different conditions on cutting edge design. A face mill equipped with finishing inserts and operated in the same machine and in the same material above runs at a lower feed rate of 0.005 inch-0.008 inches per tooth and at 0.020-0.030 inch depth of cut at 300-400 feet per minute. Although the cutting edge in finish milling is not required to withstand the same load requirements as in rough cutting, the edge must provide a considerably smoother surface finish. Values in the range about 125 RMS for fine surface milling in comparison with about 250 RMS for rough cutting are not uncommon.

Several attempts have been made to improve cutting edge performance in both rough and finish cutting tools by changing the orientation of the cutting edge with respect to the tool seat. Though varied, the approaches have included the selection of a positive or a negative rake design.

Negative rake cutting tools provide an insert seat which is inclined at a negative rake angle relative to the cutting plane and a straight sidewall form. The inclination of the insert seat assures clearance under the cutting edge.

Positive rake cutting tools provide inserts fixed to inclined seats in such a manner that inserts are required to have an inclined sidewall form to provide clearance under the cutting edge. The back wall of the insert must be inclined rearwardly to complement the sidewall form of the insert. This provides a ramp surface rather than a pocket at the back wall of the insert and requires additional means for fastening the insert. Most positive rake inserts provide only half the number of available cutting edges because they cannot be indexed end over end. Use of a negative rake insert is therefore desirable. Examples of art employing positive rake inserts include U.S. Pat. Nos. 3,938,231 and 3,868,752.

It is also known in the art to modify the orientation of the cutting edge with respect to the cutting tool and workpiece by employing positive or negative radial and axial rake angles.

Generally, the term "rake" is the angular relationship measured between a reference plane and a reference face of the insert. The reference plane passes through the cutter body central line axis and the inserts cutting corner. The reference face sometimes referred to as rake face or first surface herein is the face that sees the work piece and is dependent upon the direction of cutter rotation.

The inserts radial rake angle is the angle formed by the referenced plane and the rake face as measured in the plane perpendicular to the cutter body axis.

Radial rake is defined as positive where the rake face forms an acute angle with respect to the reference plane such that the rake face slopes away from the direction of cutter rotation when applied to a workpiece. Radial rake is defined as negative where the rake face forms an obtuse angle with the reference planes and slopes toward the direction of cutter rotation. Generally, a negative rake is preferred in applications where the cutting edge is be subject to high loading.

The insert's axial rake connotes the angle formed between the reference plane and the rake face measured in a plane perpendicular to the radius of the cutting body, at the working cutting corner. The use of negative radial rakes in combination with negative or positive axial rakes is known in the art. One example is found in U.S. Pat. No. 3,289,271.

It is also known in the art to further define the orientation of a cutting edge in terms of its true rake angle and angle of inclination or true shear. The true rake angle is defined by drawing an imaginary line normal to the cutting edge and intersecting the axis of the cutter body. The angle between the rake face and this imaginary line is the true rake angle.

The angle of inclination is defined by drawing an imaginary line through the center point of the cutter body and tangent to the radially outermost point of the cutting edge. The angle between this line and the cutting edge is the angle of inclination.

If the plane of the rake face passes through the cutter axis, the true rake is said to be zero. If the top working corner of the cutting edge is ahead of the lowermost point on the cutting edge, the true rake is said to be positive. If the radially outermost point of the cutting edge passes through the cut first, then the inclination angle is said to be negative.

GTE Valenite U.S. Pat. No. 4,352,609 discloses a face milling cutter and a cutting edge with a positive true rake angle in the range of 0° to 3° and a radial rake on the order of 0° to 2° positive, with an axial rake on the order of 4° to 6° negative. A cutting edge utilizing a positive radial rake with a negative axial rake, however, tends to not only fracture under heavy loading but also directs spent chips toward the workpiece. This results in recutting and scouring, requiring greater horse power per cubic inch of stock removed.

Attempts at modifying the performance characteristics of cutting tools has also included incorporating a lead angle. The term lead angle is known in the art and is defined as an angle formed between the radially outward facing insert edge that includes the working cutting corner and an imaginary line oriented parallel to the cutting body axis that passes through the cutting corner.

A cutting tool, which has high efficiency in both soft and difficult to machine materials and facilitates the formation of tight chip for rapid removal and also generates a smooth surface at high feed rates would be a desirable advance in the art of cutting tools. By optimizing the radial and axial rakes of the insert, the extent of the lead angle, true rake and angle of inclination, the problem of stocking multiple cutters and inserts for rough cutting and finishing is alleviated.

One object, therefore, in the present invention is to provide a cutting tool employing lay down indexable inserts which includes an enhance cutting edge and which generates short, tightly curled chips.

A further object of the present invention is to provide a cutting tool employing a lay down indexable insert which can withstand high feed rates in difficult to machine materials without failure and simultaneously deliver a smooth final finish on the order of 125 RMS or better.

A further object of the present invention is to provide a cutting tool employing a lay down indexable insert which is easy to manufacture and where the dies for the insert are made according to standard machining practices.

SUMMARY OF THE INVENTION

Accordingly, these objects are accomplished by a cutting tool having a body with a central axis where the body has at least one recessed pocket disposed about the axis for receipt of at least one cutting insert. The insert comprises a wafer of cemented carbide having parallel polygonal shaped top and bottom faces. The insert is mounted in the recessed pockets by securing means. Both the top and bottom face is separated from the other by at least three peripheral side sections which intersect to form at least one acute angle with an adjoining side. Each of the side sections includes an upper first and lower second planar surface which intersect at an included obtuse angle to form a line which is parallel to imaginary planes passing through the top and bottom faces. The first surface of one of the peripheral adjoining sides intersects with the top face at a right angle. The first and second surface of at least one of the adjoining peripheral side sections intersect the top face at an obtuse angle and the bottom face at a right angle, respectively. The intersection of adjoining first surfaces at an acute angle creates at least one cutting edge having a negative radial rake and a positive axial rake. The cutting edge also employs a positive lead angle, a negative true rake and a positive angle of inclination.

BRIEF DESCRIPTION OF THE DRAWINGS

These and other objects and features of the invention will become apparent from a reading of a detailed description of a preferred embodiment taken in conjunction with the drawings in which.

DETAILED DESCRIPTION OF THE PREFERRED EMBODIMENT

Figure 1:
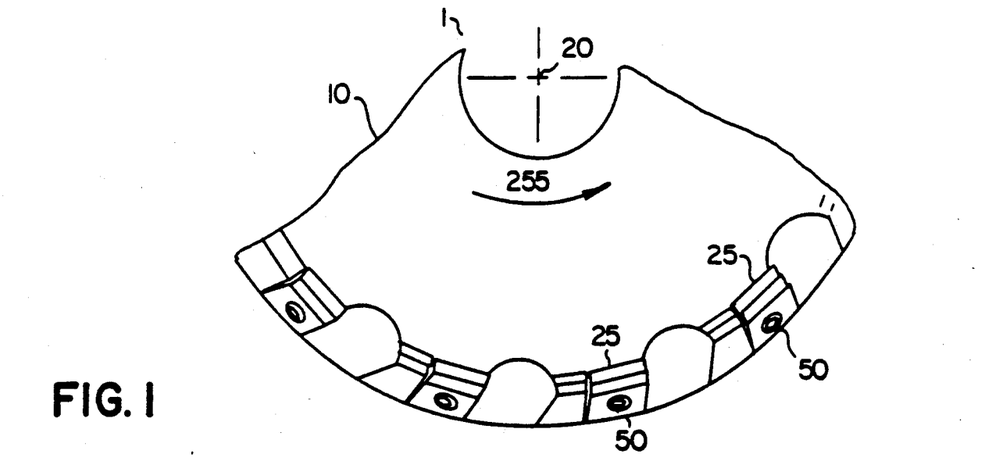
FIG. 1 is a fragmentary axial view of a milling cutter fashioned in accordance with the principles of the invention.
Figure 2:
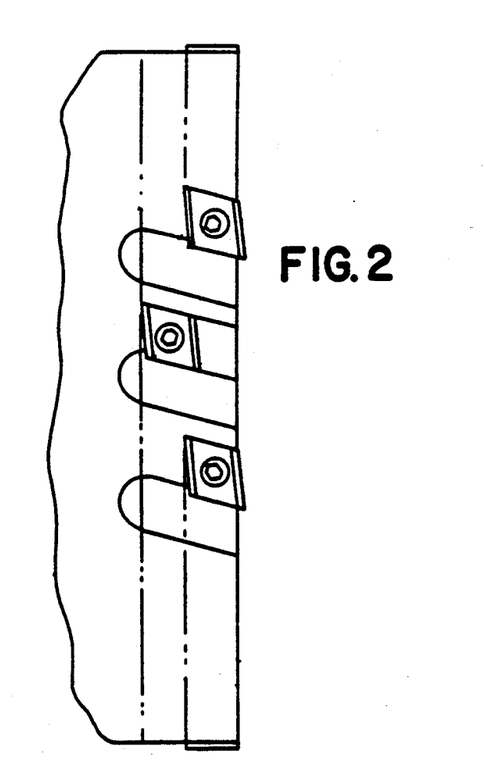
FIG. 2 is an elevated schematic side of a milling cutter illustrating overlapping fields of cutting.
Figure 3:
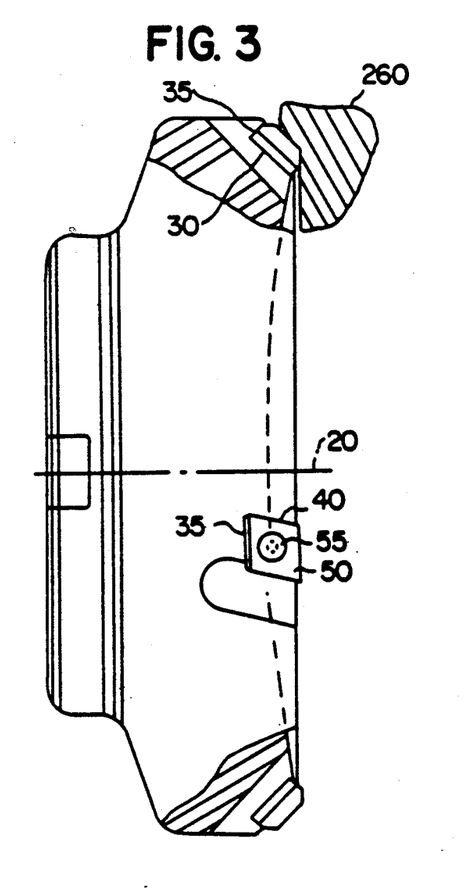
FIG. 3 is a schematic side elevation of a milling cutter illustrating the location of a single cutter insert in relation to a fragmentary workpiece.

Referring to FIGS. 1 and 3, a cutting tool 1 is illustrated having a body 10 designed for rotation about a longitudinal axis 20. The body includes at least one recessed pocket 25 which is designed for receipt of an indexable insert 50. FIG. 1 illustrates a face milling tool where the inserts are spaced at equivalent radial distances from the center axis. It should be readily apparent to those of ordinary skill in the art that the use of a face mill is for illustrative purposes only and the present invention could just as easily be adapted to any number of cutting tools mentioned above including those which stagger the orientation of the insert pockets to provide overlapping fields of cutting such as shown in FIG. 2. It should also be apparent to those of ordinary skill in the art that the present invention could just as easily be employed in turning tool applications where the cutting tool remains stationary and the workpiece is rotated or in broaching applications.

Referring to FIG. 3, each pocket is milled from the tool body by standard milling techniques to include a seat face 30 and at least one abutment wall 35. Preferably, a second abutment wall 40 is milled from the tool body to provide adjoining abutment wall surfaces. Seat face 30 is generally planar and includes an aperture which is threaded for a receipt of a retaining screw (not shown). It should be apparent that the present invention is not limited to any particular means of fixing insert 50 in pocket 25. Reference hereafter will be made to screw which passes through aperture 55 and threads into the beforementioned aperture in seat face 30 to force the insert 50 into a secure abutting relationship with walls 35 and 40. The insert could just as easily employ any number of pin or clamp designs commonly available in the art. The present invention also recognizes that various brazes commonly known in the art may be employed to secure the insert. One particular braze is disclosed in U.S. Pat. No. 4,389,074 assigned to GTE Products Corporation.

Insert 50 is a wafer of hardened material selected from the group including cemented carbides such as tungsten carbide, silicon nitride or Ceramic or other materials sufficiently resilient to withstand the forces encountered in stock removal such as cast iron carbon steel, alloys of nickel, chrome materials, aluminum, and exotics such as titanium or composite materials. Preferably VC55 tungsten carbide produced by GTE Valenite is used in steel applications. Other carbide grades are available from GTE Valenite the selection of which depends in part on the application to which the tool is applied.

Figure 4:
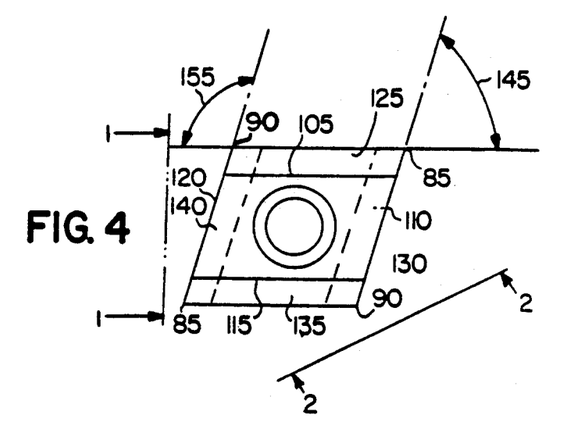
FIG. 4 is a schematic mounting face view of an insert having parallel top and bottom faces, parallelogram in form.
Figure 5:
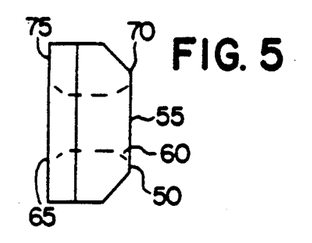
FIG. 5 is a view of a side face taken from the direction of line 1—1 of FIG. 4.

Although the configuration of the insert is generally polygonal in form and therefore may include triangular, circular, or square geometries, reference hereafter will be to a parallelogram for purposes of convenience. As shown in FIGS. 3, 4, and 5, insert 50 includes an aperture 55 and recessed conical portions 60, 65 located in top face 70 and bottom face 75. The top and bottom faces are generally parallel.

Each face 70, 75 is parallelogram in form with at least one and preferably two pairs of oppositely oriented corner sections 85, 90. Each face 70, 75 includes four-edge surfaces 105, 110, 115, 120 which intersect at oppositely oriented pairs of corners 85, 90 to form oppositely oriented acute and obtuse included angles of between about 0° and 90° and 90° and 180°, respectively.

Figure 6:
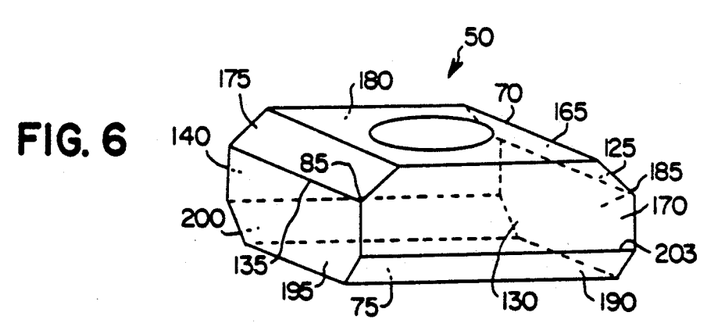
FIG. 6 is a perspective view taken from the direction of line 2—2 of an outermost side cutting corner of FIG. 4.

Referring to FIGS. 4, 5 and 6, the top and bottom faces 70, 75 are separated by at least three and preferably four adjoining peripheral side sections 125, 130, 135, 140. In one embodiment, each side adjoins two other sides at corners 85, 90 to form two pair of sides opposed in orientation where side 125 forms an acute included angle 145, and an obtuse included angle 155 with adjoining sides 130, 120. It is generally recognized to those of ordinary skill in the art that the range of the acute and obtuse angles may vary and is dependent on the shape of the insert and the application.

Each of the side sections include a first upper surface illustrated in FIG. 6 at 165, 170, 175, 180, and a second surface at 185, 190, 195, 200. At least one pair of oppositely oriented first surfaces 170, 180 are parallel to each other and intersect with the top face 70 to sweep out right angles. At least two second surfaces 185, 195 are oppositely oriented, parallel to each other, and intersect with bottom face 75 to sweep out right angles. First surfaces 165, 75 (and 170, 180) form included obtuse angles with respect to top face 70 (and bottom face 75) of between about 91° to about 179° degrees. A range of between about 91° to about 140° degrees in conjunction with a lead angle of 0°-45° degrees is preferred when optimum surface finish is desired. Each respective side section surrounds the periphery of the insert 50 with alternating first sections forming right and obtuse angles with respect to top and bottom faces 70, 75. For each individual side, the respective first and second surfaces intersect to form a line 203 which is parallel to top face 70 and bottom face 75. On one index, the first surface 170 and the second surface 195 may be secured against adjoining abutment walls 35, 40 (see FIGS. 1, 3), when seated securely in pocket 25.

First surface 175 of side 135 intersects with first surface 170 of the second side 130 at corner 85 and forms one of at least two oppositely oriented cutting edges. The number of cutting edges selected, however, is dependent in part on the shape of the insert.

In an alternate embodiment, the oppositely oriented pair of first surfaces adjoining the vertical planar first surfaces referenced above are crowned to facilitate fine finished turning. The crown is formed by a radius calculated in accordance with the formula $$R = \frac{C^2 + 4H^2}{8H}$$

where C constitutes the width or chord of the first section extending between the top face and its intersection with the second face, and H constitutes the height of the crown. An insert with a ⅜ I.C. and 5/16 inch thick, employs a crown height of between about 0.0002 inches to about 0.0015 inches. The width of the crown C is dependent in part upon the size of the insert selected. A radius of about 2.813 inches is employed where a chord width of 0.150 and a height of 0.001 are selected. The radius is measured perpendicular to the chord. The magnitude of the radius is dependent in part on the degree of surface finish desired. The embodiment alleviates the problem of a wavey or shingled surface finish caused by spindle tilt.

In another embodiment, the insert may be scalloped to facilitate smaller chip width and to reduce horsepower requirements. A scalloped edge portion is oriented on the clearance face of the insert defined along the edge created by the intersection of the top face with a first surface or rake face which extends generally perpendicular thereto. The scalloped sections may be oppositely oriented where the insert configuration includes parallelogram shape top and bottom faces. The scallops may be produced on the insert by manufacturing methods known in the art such as disclosed in U.S. Pat. No. 4,606,678, column 1, lines 65-68 and column 2, lines 1-25 of which are hereby incorporated by reference. Other methods are known in the art and will not be further discussed herein. The number of scallops per section is dependent on the surface finish desired. The greater the number of scallops, the finer the finish and the lower the horsepower requirements for machining. Each insert side, when mounted in a tool body, is phased differently from the remaining inserts to facilitate the removal of the high and low points formed by the scalloping. By staggering the orientation of the scalloped section, overlapping fields of cutting generate a smooth flat surface.

In another embodiment, the insert may include a crowned surface as disclosed above on the first surface (or rake face) in addition to the beforementioned scalloping.

Figure 12:
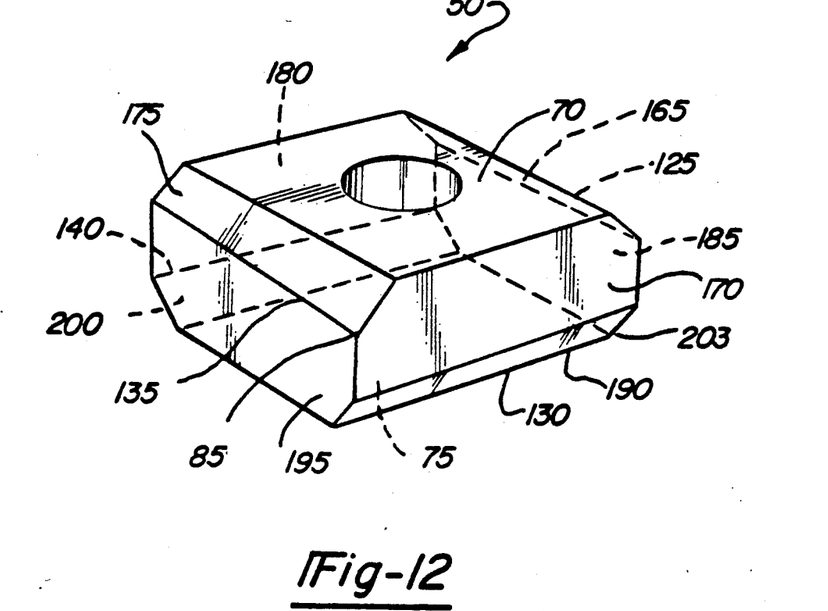
FIG. 12 is a perspective view of an alternate embodiment taken from the direction of lines 2—2 of an outermost side cutting corner of FIG. 4.
Figure 13:
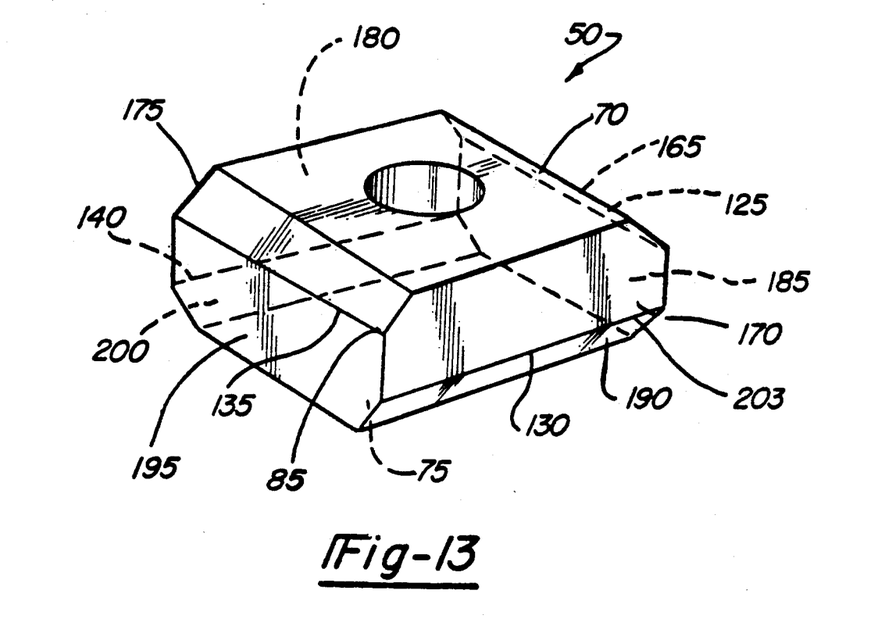
FIG. 13 is a perspective view of an alternate embodiment taken from the direction of lines 2—2 of an outermost side cutting corner of FIG. 4.

In yet another embodiment, the intersection of first and second surfaces per side form a line which is skewed toward top face 70 or bottom face 75 depending on the index (see FIGS. 12 and 13). This serves to strengthen the cutting edge due to the additional material of the enlarged second surface. An enlarged length of cut is also provided due to the diminished portion of the first surface adjoining the cutting edge. Alternatively, the line may be skewed to provide an increasing section of the first surface. This serves to increase both the axial rake and the angle of inclination facilitating cutting in soft materials such as low silicon aluminum, soft brass or lead.

Figure 8:
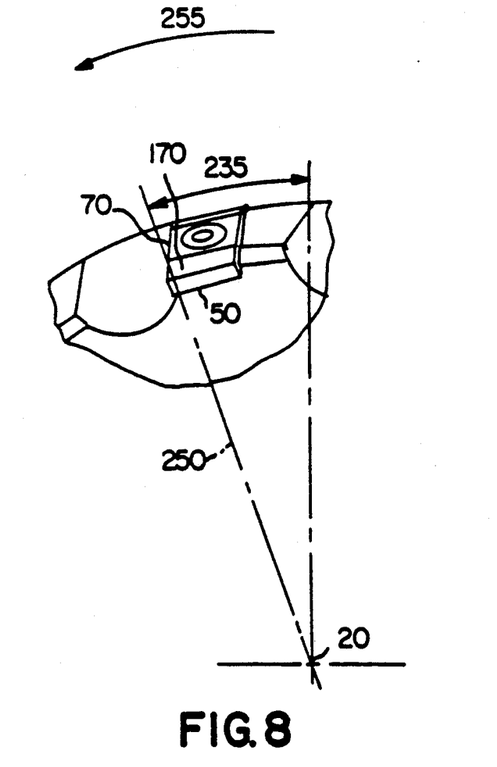
FIG. 8 is a view taken from the direction of line 3—3, of FIG. 7, illustrating a radial rake angle.

The orientation of the cutting edges with respect to the insert's radial and axial rake angles, lead angle, angle of inclination and true rake angle, is particularly important to the present invention. With regard to FIG. 8, insert 50 has a negative radial rake angle 235 formed by the intersection of first surface 170 and top face 70 as measured in an imaginary plane 250 oriented perpendicular to the cutter body axis 20. Top face 70, as illustrated, slopes toward the direction of cutter rotation 255 when applied to workpiece (not shown). A negative radial rake of 0° to 30° augments cutting edge strength due to the 90° included corner. As stated above, the 90° edge is formed by the intersection of the first surface 170 and the top insert face 70. Clearance is provided by the negative radial rake angle. As the cutting edge approaches 0° radial, the clearance angle lessens. In particular, a radial rake angle between 10°-20° is preferred. A rake angle rake beyond 30° causes the true rake to become too negative to cut efficiently as the cutting face begins to become increasingly tangent to the work surface.

Figure 10:
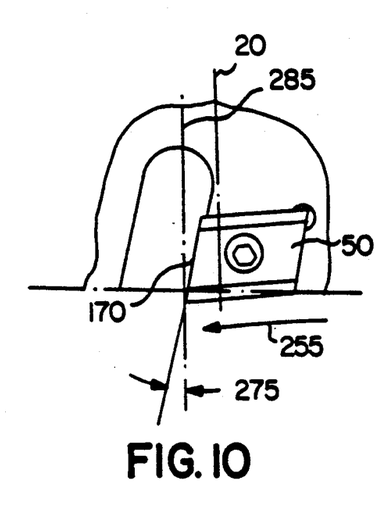
FIG. 10 is a view taken from the direction of line 5—5, of FIG. 7, illustrating an axial rake angle.

Insert 50 is oriented with a positive axial rake as illustrated in FIG. 10. The axial rake angle 275 is formed between the intersection of imaginary planes passing between the first surface 170 of insert 50 and a line 285 oriented parallel to the cutting tool axis of rotation 20. Preferably, the first surface 170 slopes away from the direction of cutter rotation as illustrated by arrow 255 when applied to a workpiece (not shown). A positive axial rake angle between about 10° to about 20°, directs material away from work surface and favors the formation of tightly spiraled chips. This helps to achieve a finer surface finish by eliminating, recutting and scouring. In addition, the positive angle requires less horse power because the positive axial rake functions as a chisel rather than a plow.

A preferred axial rake angle range of 10° to 15° positive combined with a negative radial rake results in obtaining a positive inclination of 15° to 25° degrees which provides for improved shearing of the material. As the axial rake increases beyond 20° degrees, the cutting edge became too frail to support heavy cutting in difficult to machine materials. A change from 20° to 30° degrees would increase the negative radial rake and increase the negative true rake. A more positive angle of inclination would also be generated. If radial rake were not increased, the clearance of the flank surfaces would be thereby greatly reduced leading to heeling of the cutter and ultimately a diminished tool life.

Figure 7:
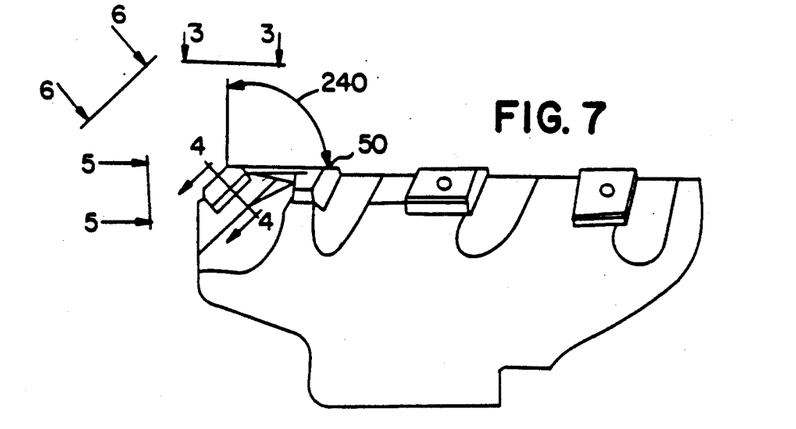
FIG. 7 is an edgewise view normal to at least one cutting edge of the cutter of FIG. 1 illustrating a lead angle of the present invention.

Referring to FIG. 7, a lead angle 240 of 0°-90° degrees allows the cutter to advance a greater distance per tooth than the actual chip thickness. For example, with a 90° lead and a feed rate of 0.010 inches per tooth, an actual chip thickness of 0.010 inch per tooth develops. With a 45° lead and a feed rate of 0.010 per tooth, a 0.007 actual chip thickness is found. The lead angle, therefore, allows for parts to be milled faster making the tool more economical.

Figure 9:
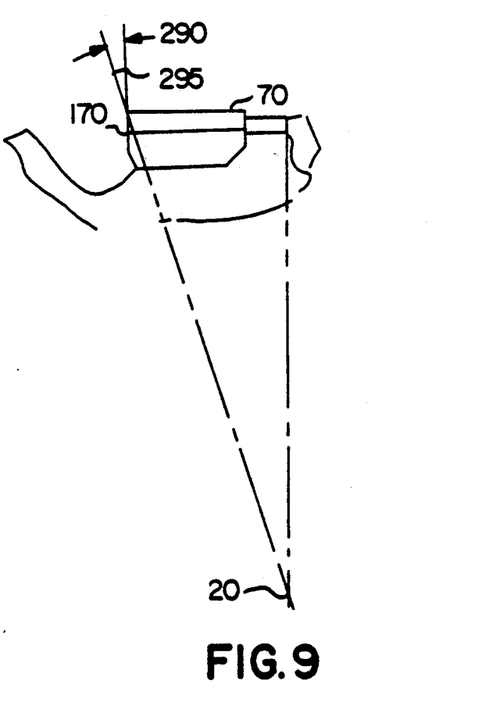
FIG. 9 is a view taken from the direction of line 4—4, of FIG. 7, illustrating a true rake angle of the present invention.

Enhanced results may be obtained where the cutting edge employs a negative true rake angle between about 5° to about 10°. Referring to FIG. 9, the true rake angle 290 is swept out by imaginary plane 295 formed through top face 70 and first surface 170. Plane 295 is normal to axis 20. A preferred range of 7° to 8° has been determined through testing. As the angle approaches 10° additional horse power is required to maintain cutting speed over the workpiece.

Figure 11:
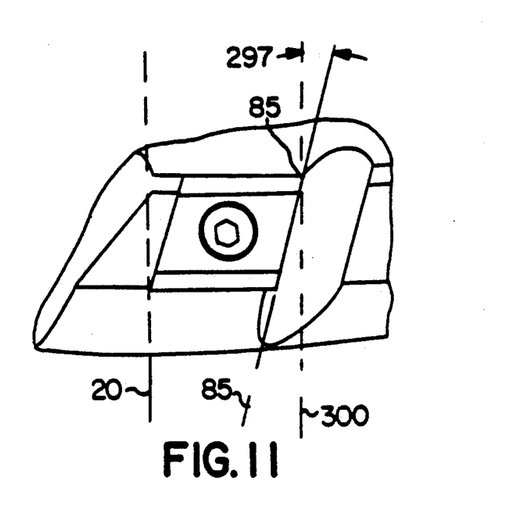
FIG. 11 is a view taken from the direction of line 6—6, of FIG. 7, illustrating an angle of inclination of the present invention.

Referring to FIG. 11, inclination angle 297 is defined by drawing an imaginary line 300 parallel to axis 20 and passing through corner 85. A preferred angle of 15° to about 25° directs chips away from the finish surface of the workpiece. As the angle of inclination increases, the cutting edge becomes too fragile for rough cutting. In addition, an angle in excess of 25° degrees renders the cutting edge too brittle for exotic materials.

An embodiment of the present invention as illustrated in FIG. 1 was constructed for purposes of evaluation. The face mill utilized a 6 inch cutting diameter and was equipped with 12 inserts arranged about the periphery. Inserts were formed from GTE Valenite VC55 tungsten carbide and were oriented with 21° negative radial and 10° positive axial rake angles and with an 8° negative true rake and 21° positive angle of inclination. Testing was done on a 50 horsepower Cincinnati vertical milling machine using 1045 (AISI) steel with a hardness coefficient of 210 bhn and a tensile strength at 120 ksi. Parameters of feed per tooth traveled, net horse power, horse power per cubic inch and surface finish were measured.

TABLE I

| Cut No | FPT | Net HP | HP/IN3 | RMS |
| --- | --- | --- | --- | --- |
| 1 | .0056 | 15.2 | .95 | 63 |
| 2 | .0064 | 16.9 | .92 | 50 |
| 3 | .0079 | 20.2 | .86 | 52 |
| 4 | .0092 | 22.2 | .84 | 42 |
| 5 | .0114 | 27.3 | .83 | 27 |
| 6 | .0131 | 30.5 | .81 | 35 |
| 7 | .0158 | 36.9 | .81 | 58 |
| 8 | .0183 | 40.9 | .78 | 68 |
| 9 | .0228 | 52.1 | .79 | 86 |

As illustrated above, the embodiment produced mean value results of 84.3 for horse power per cubic inch milled and 53.4 RMS for surface finish. It will be understood that other embodiments and modifications of the invention are contemplated. It is the intention to include all such embodiments and modifications within the scope of the invention as are defined by the appended claims.

I claim:

1. A cutting tool comprising a body with a central axis, said body having at least one recessed pocket disposed about said axis for receipt of at least one cutting insert, a cutting insert within said at least one recessed pocket, means for securing said insert in said at least one recessed pocket, said insert comprising a wafer of hardened material with polygonal shaped top and bottom faces, said top and bottom faces oriented parallel to each other and separated by at least three adjoining peripheral side sections, each of said side sections forming at least one acute angle with an adjoining side, each of said side sections further comprising first and second surfaces which intersect with each other to form an obtuse included angle, said intersecting surfaces forming a line which is skewed with respect to the plane of said top and bottom faces, said first surface of one side intersecting said top face at a right angle, said first and second surfaces of at least one adjoining side intersecting said top face at an obtuse included angle and said bottom face at a right angle respectively, said first surfaces on adjacent sides intersecting at an acute included angle to form at least one cutting edge, said cutting edge having a positive lead angle, and said cutting edge having a negative true rake and a positive angle of inclination.

2. A cutting tool comprising,
a tool body rotatable about a central axis,
said body having recessed pockets disposed therein for receipt of indexable cutting inserts,
said pockets disposed about said axis in a staggered array which provides for overlapping fields of cutting,
a cutting insert in at least some of said pockets,
means for securing said inserts in said pockets,
said inserts comprising a wafer of hardened material with parallel polygonal top and bottom faces,
said top and bottom faces oriented parallel to each other and separated by at least four adjoining peripheral side sections,
said at least four side sections comprising two pairs of opposed sides where each side forms an acute and an obtuse angle with adjoining sides,
each of said sections further comprising first and second surfaces which intersect with each other to form an obtuse included angle,
said intersecting surfaces forming a line which is skewed with respect to the surface of said top or bottom face,
said first surface of one side intersecting said top face at a right angle,
said first and second surfaces of at least one adjoining side intersecting said top face at an acute included angle and said bottom face at a right angle respectively,
said first surfaces on adjacent sides intersecting at an acute included angle to form at least one cutting edge,
said insert having at least two oppositely oriented cutting edges,
said cutting edge having a negative radial rake and a positive axial rake,
said cutting edge having a positive lead angle, and
said cutting edge having a negatine true rake and a positive angle of inclination.

3. The cutting tool of claim 2 wherein said pockets comprise a planar seating face and include at least two adjoining abutment walls.

4. The cutting tool of claim 3 wherein said seating face includes a threaded aperture.

5. The cutting tool of claim 4 wherein said bottom face is secured in said pocket seat.

6. The cutting tool of claim 5 wherein said inserts are made of tungsten carbide.

7. The cutting tool of claim 6 wherein said inserts include an aperture which intersects said top and bottom faces and further includes conical sections recessed in said top and bottom faces.

8. The cutting tool of claim 7 wherein said mounting means comprises a screw which threads into said seating face forceably securing said top or bottom face against said seating face.

9. The cutting tool of claim 8 wherein said top and bottom faces are parallelogram in shape with at least two pair of parallel sides.

10. The cutting tool of claim 9 wherein said cutting edge has a lead angle of between about 0° to about 9°.

11. The cutting tool of claim 10 wherein said line formed by the intersection of said first and second faces, decreases from said acute angled corner section toward an imaginary plane passing through said bottom face.

12. The cutting tool of claim 11 wherein said line formed by the intersection of said first and second faces, increases from said acute angled corner section on imaginary planes passing through said top face.

13. The cutting tool of claim 12 wherein said negative radial rake is between about 0° to about 30°.

14. The cutting tool of claim 13 wherein said positive axial rake is between about 0° to about 20°.

15. The cutting tool of claim 14 when said negative true rake is between about 5° to about 10°.

16. The cutting tool of claim 15 wherein said positive angle of inclination is between about 0° to about 30°.

17. A cutting tool comprising,
a tool body rotatable about a central axis,
said body having recessed pockets disposed about said axis for receipt of indexable cutting inserts,
cutting inserts in at least some of said pockets,
means for securing said inserts in said pockets,
said inserts comprising a wafer of hardened material with parallel top and bottom faces parallelogram in form having at least one pair of opposed acute angled corner sections,
said faces separated by four adjoining peripheral side sections,
said side sections forming both an acute included and an obtuse included angle with said adjacent sides at said corner sections,
each of said sides further comprising first and second surfaces which intersect with each other to form an obtuse included angle,
said intersecting surfaces forming a line which decreases from said acute angled corner section toward the plane defined by said bottom face,
said first surface of opposite sides intersecting said top face to form right angles,
said first and second surfaces of at least one adjoining side intersecting said top face at an acute included angle and said bottom face at a right angle respectively,
said insert having at least two oppositely oriented cutting edges, formed by adjoining first surfaces at each of said oppositely oriented acute corner sections of said top and bottom faces,
said cutting edge having a negative radial rake and positive axial rake,
said cutting edge having a negative true rake angle,
said cutting edge having a positive lead angle, and a positive angle of inclination of between about 15° to about 25°.

18. The cutting tool of claim 17 wherein said pockets comprise a planar seating face and include at least two adjoining abutment walls.

19. The cutting tool of claim 18 wherein said seating face includes a threaded aperture.

20. The cutting tool of claim 19 wherein said inserts are made of tungsten carbide.

21. The cutting tool of claim 20 wherein said bottom face is secured in said pocket seat.

22. The cutting tool of claim 21 wherein said inserts included an aperture which intersects said top and bottom faces and further includes conical sections recessed in said top and bottom faces.

23. The cutting tool of claim 22 wherein said mounting means comprises a screw which threads into said seating faces and forceably securing said top or bottom face against said seating face.

24. The cutting insert of claim 23 wherein said top and bottom faces are parallelogram in shape with at least two pair of parallel sides.

25. The cutting insert of claim 24 wherein said cutting edge has a lead angle of between about 0° to about 90°.

26. The cutting edge of claim 25 wherein said negative radial rake is between about 10° to about 20°.

27. The cutting edge of claim 26 wherein said positive axial rake is between about 0° to about 30°.

28. The cutting edge of claim 27 when said negative true rake is between about 5° to about 10° and said positive angle of inclination is between about 0° to about 30°.

29. A cutting tool comprising,
a tool body rotatable about a central axis,
said body having recessed pockets disposed about said axis for receipt of indexable cutting inserts,
said pockets having a planar seating face with adjoining abutment walls,
said planar seating face having a threaded aperture,
cutting inserts in at least some of said pockets,
said inserts comprising a wafer of cemented carbide with an aperture which traverses top and bottom faces and is designed for receipt of a screw which mates with said seat aperture to forceably secure said insert into abutting relationship with said walls,
said inserts further comprising parallel top and bottom faces, parallelogram in form, with oppositely oriented pairs of edge surface,
said edge surfaces intersecting at four corner positions per face forming at least one pair of acute angles at opposite corners,
said faces separated by four adjoining peripheral side sections,
said four sides comprising two pairs of oppositely oriented sides where each side forms both an acute included angle and obtuse included angle with adjoining sides,
each of said sides further comprising first and second surfaces which intersect to form an obtuse included angle,
said intersecting surfaces forming a line which decreases from said acute angled corner toward a plane defined by said bottom face,
a pair of oppositely oriented first surfaces intersecting said top face to form right angles,
said first and second surfaces of at least one adjoining side intersecting said top face at an acute included angle and said bottom face at a right angle,
said insert having at least two oppositely oriented cutting edges formed by the intersection of said adjoining first surfaces at each of said two corner sections of said top and bottom faces,
said cutting edge having a negative radial rake of about 21° and a positive axial rake of about 10°,
said cutting edge having a lead angle of about 45°, and
said cutting edge having a positive angle of inclination of about 21°.

30. The cutting tool of claim 29 wherein said inserts are made of tungsten carbide.

* * * * *